United States Patent [19]

Sienel

[11] Patent Number: 5,058,306
[45] Date of Patent: Oct. 22, 1991

[54] DEVICE FOR ROPING FISH

[76] Inventor: Hans N. Sienel, 154 Toledo St., Farmingdale, N.Y. 11735

[21] Appl. No.: 585,391

[22] Filed: Sep. 20, 1990

[51] Int. Cl.⁵ .......................................... A01K 97/14
[52] U.S. Cl. .............................................. 43/5; 43/6; 294/19.1; 294/19.3
[58] Field of Search ................. 43/5, 6; 294/19.1, 19.3

[56] References Cited

U.S. PATENT DOCUMENTS

| | | | |
|---|---|---|---|
| 2,591,638 | 4/1952 | Trafton | 294/19.1 |
| 2,700,252 | 1/1955 | Paganelli | 294/19.1 |
| 2,704,052 | 3/1955 | Wood | 43/5 |
| 3,540,769 | 11/1970 | Rosser | 43/6 |
| 5,009,181 | 4/1991 | Upchurch | 294/19.1 |

FOREIGN PATENT DOCUMENTS 28766 of 1909 United Kingdom .................... 43/5

Primary Examiner—Kurt Rowan
Attorney, Agent, or Firm—Toren, McGeady & Associates

[57] ABSTRACT

A fish roping device, having a relatively U-shaped spring member with two arms, a rigid handle connected to the base section of the U-shaped spring member, a first arcuate member having a first end and a second end, the first arcuate member being pivotably connected near its second end to one arm of the spring member, a second arcuate member having a first end and a second end, the second arcuate member being pivotably connected near its second end to another arm of the spring member, a hinge for connecting together the second ends of the first and second arcuate members so that the arcuate members pivot relative to one another, the first and second arcuate members being movable between an open position in which the arms of the U-shaped member are pushed apart from a rest position, and a closed position which is entered when an impact is imparted on the hinge so that the arms of the U-shaped spring member return to the rest position, a rope having one end releasably connected to the first end of the first arcuate member and running therefrom through the hinge, the first end of the second arcuate member, to the handle; and a hook and ring respectively provided at the first ends of the first and second arcuate members for forming a loop in the rope which is tightenable by pulling on the rope when the arcuate members are in the closed position.

12 Claims, 3 Drawing Sheets

DEVICE FOR ROPING FISH

BACKGROUND OF THE INVENTION

The present invention relates to a device for securing a rope around the tail of a fish for the purpose of pulling the fish to the side of a boat and securing the same thereto.

It is well known that in fishing, once the fish is caught and brought alongside a boat, the fish must be secured so that it can be brought on board or secured alongside the boat. The conventional method of securing and landing a fish is to use a gaff which punctures and embeds itself in the fish so that the fish can be lifted out of the water by means of the gaff. Although a gaff is an effective apparatus for removing a fish from the water, it has the significant drawback of causing substantial damage to the fish body. Such damage, which can take the shape of puncture holes, is highly undesirable in that it reduces the monetary value of the fish as a food item. Additionally, such punctures in the fish are undesirable in that they make it extremely difficult for a sports fisherman to have the fish, in its natural condition, mounted by a taxidermist. Furthermore, the use of a gaff makes it virtually impossible to return a fish to the sea after it has been caught.

SUMMARY OF THE INVENTION

Accordingly, it is an object of the present invention to provide an apparatus for securing fish without puncturing the body of the fish. Such an apparatus overcomes the above-mentioned problems with the prior art gaffs, and is also usable for purposes such as tagging or marking fish, since the fish can be brought on board or held alongside a boat without injury so that it can be marked and then later released. This was not possible utilizing a gaff.

Pursuant to this object, and others which will become apparent hereafter, one aspect of the present invention resides in a device having a relatively U-shaped spring member with two arms connected at a base section. A rigid pole or handle is connected to the base section of the spring member so as to allow the operator to utilize the device.

Two arcuate members are connected together at one end by a hinge and are further attached, near the hinged ends, to the outer ends of the arms of the U-shaped spring member. The arcuate members are attached to the spring member so as to be movable between an open position and a closed position. In the open position, the two arcuate members form an approximately U-shape. In the open position, the arcuate members cause the arms of the spring member to be pushed apart so that a spring tension exists in the spring member.

When a blow is directed against the hinge connecting the arcuate members, the tensioned arms of the U-shaped spring member return to a less tensioned position and cause the arcuate members to pivot together to form a closed, roughly circular configuration.

The ends of the arcuate members opposite the hinged together ends are provided with a ring and a hook, respectively. A rope is fastened at one end to the hook, and runs from the hook to the hinge between the arcuate members, and from the hinge through the ring in the other arcuate member, and from this ring up to the handle, where the rope is held in some fashion by the operator of the device. The rope can also be held in tension by an elastic band which is connected to the rigid pole or handle.

When the arcuate members are in the open position, the rope forms a triangle. When the operator desires to rope the tail end of a fish, he strikes the tail end of the fish in a spear-like manner with the device in the area of the hinge between the arcuate members. This causes the arcuate members, together with the rope, to close about the tail of the fish. When the outer ends of the arcuate members carrying the ring and the hook strike one another to form the roughly circular shape mentioned above, the hook grasps the ring and the ring and the hook are disengaged from the arcuate members by physically pulling back the rigid pole or handle so that the remainder of the device is separable from the rope while the rope remains as a sort of noose around the tail of the fish.

It is desirable for the elements making up the device to be formed of a material which is resistent to water. The rope is preferably made of nylon so as to also be resistent to the corrosive nature of water, specifically salt water. The components of the roping device can be made of materials such as aluminum, stainless steel, Monel, nylon, or some sort of carbon fiber.

In another embodiment of the invention, the handle is threaded or locked by some other means into the base of the U-shaped member so that it is removable therefrom. The handle can also be telescoping so as to allow easier storage of the roping device.

If the inherent springiness of the U-shaped member is insufficient to close the arcuate members quickly enough, an additional spring can be arranged between the arms of the U-shaped member so as to assist in their return to the initial position.

In still another embodiment, the rope is held at the hinge between the arcuate members by hook elements integral with the two parts of the hinge so as to close about the rope when the arcuate members are in the open position, and open so as to release the rope when the arcuate members are in the closed position.

In order to avoid damage to the fish, the ring provided at the outer end of one of the arcuate members, through which the rope passes, is angled inwardly so as to reduce the possibility of digging into the fish.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4b is a top view of the ring in FIG. 4a; and

DETAILED DESCRIPTION OF THE PREFERRED EMBODIMENTS

Figure 1:
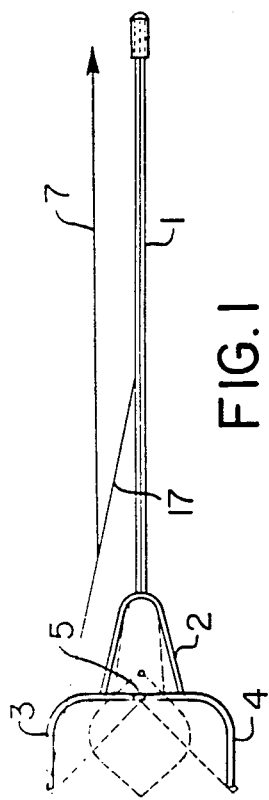
FIG. 1 is a top view of a device for roping fish pursuant to the present invention.

As can be seen from FIG. 1, the roping apparatus is made up of a handle 1 which is of a sufficient length to allow an operator to safely snare the tail end of a fish from the deck of a boat. The handle is connected to the base portion of a relatively U-shaped spring member 2. Arcuate members 3, 4, which are connected together by a hinge 5 so that the members 3, 4 can pivot relative to one another, are each connected to one arm of the U-shaped spring member 2.

Figure 2:
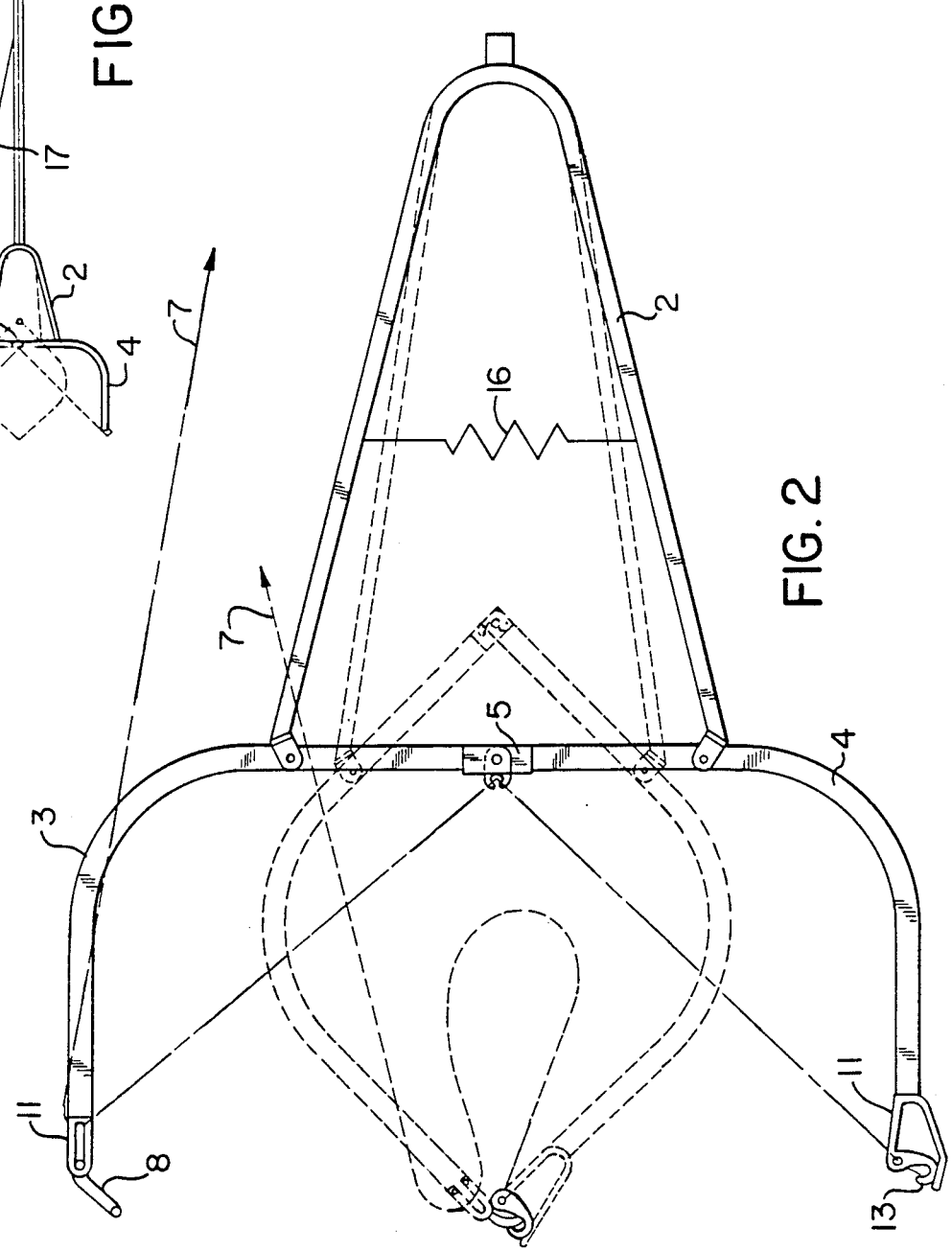
FIG. 2 illustrates the device in an opened position and a closed position.

As shown in FIG. 2, the arcuate members 3, 4 have an open position and a closed position relative to one another. The open position is shown in solid lines while the closed position is shown in dashed lines. The arms of the U-shaped spring member 2 are connected to the arcuate members 3, 4 so that when the arcuate members 3, 4 are in the open position there is spring tension between the arms of the U-shaped spring member 2. The hinge 5 locks the arcuate members in the open position.

When the roping device is thrust at a fish, and the hinge 5 strikes the body of the fish, the hinge 5 closes and the arcuate members 3, 4 are forced into their closed position by the spring force of the U-shaped spring member 2.

Figure 3A:
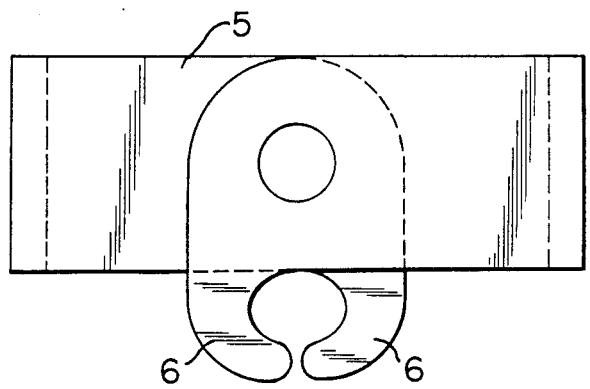
FIG. 3a is a view of a hinge connecting the arcuate members in a closed position.
Figure 3B:
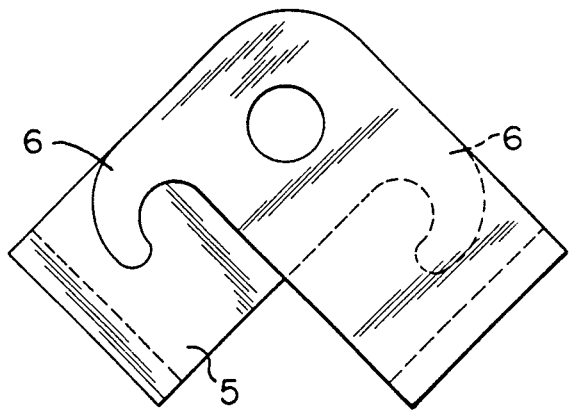
FIG. 3b is a view similar to FIG. 3a of the hinge in an open position.

The hinge 5 is illustrated in greater detail in FIGS. 3 and 3b. FIG. 3a shows the hinge 5 when the arcuate 3, 4 members are in their open position. The hinge 5 has jaw members 6 which are closed in the open position of the arcuate members 3, 4. The closed jaw members 6 form an opening through which a rope 7 can pass. When the arcuate members return to their closed position, the jaw members 6 of the hinge 5 open so as to release the rope 7.

Figure 4A:
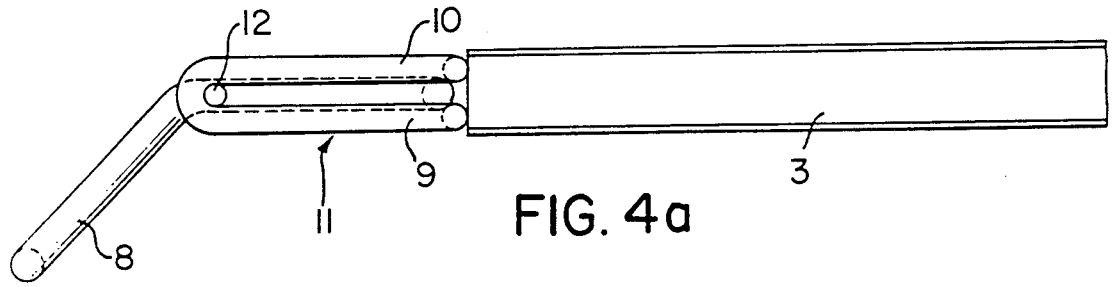
FIG. 4a is a side view of the ring through which the rope passes.
Figure 4B:
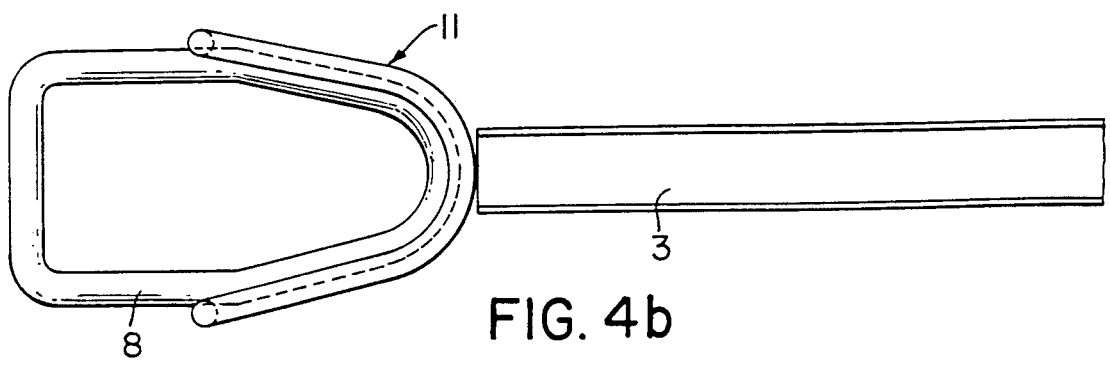

As shown in FIGS. 2, 4a and 4b, the free end of one of the arcuate members 3 is provided with a ring 8 which is releasably held between parallel arms 9, 10 of a holding member 11. In order to avoid injury to a fish, the 8 ring can be bent 45° so as to point toward the other arcuate member 4. Near the area where the ring 8 is bent, small points 12 are provided which engage between the parallel arms 9, 10 of the holding member 11. The ring 8 is releasable from the member 11 after an impact is imparted upon the ring 8 and by physically pulling the handle 1 and the rope 7 backwards.

Figure 5:
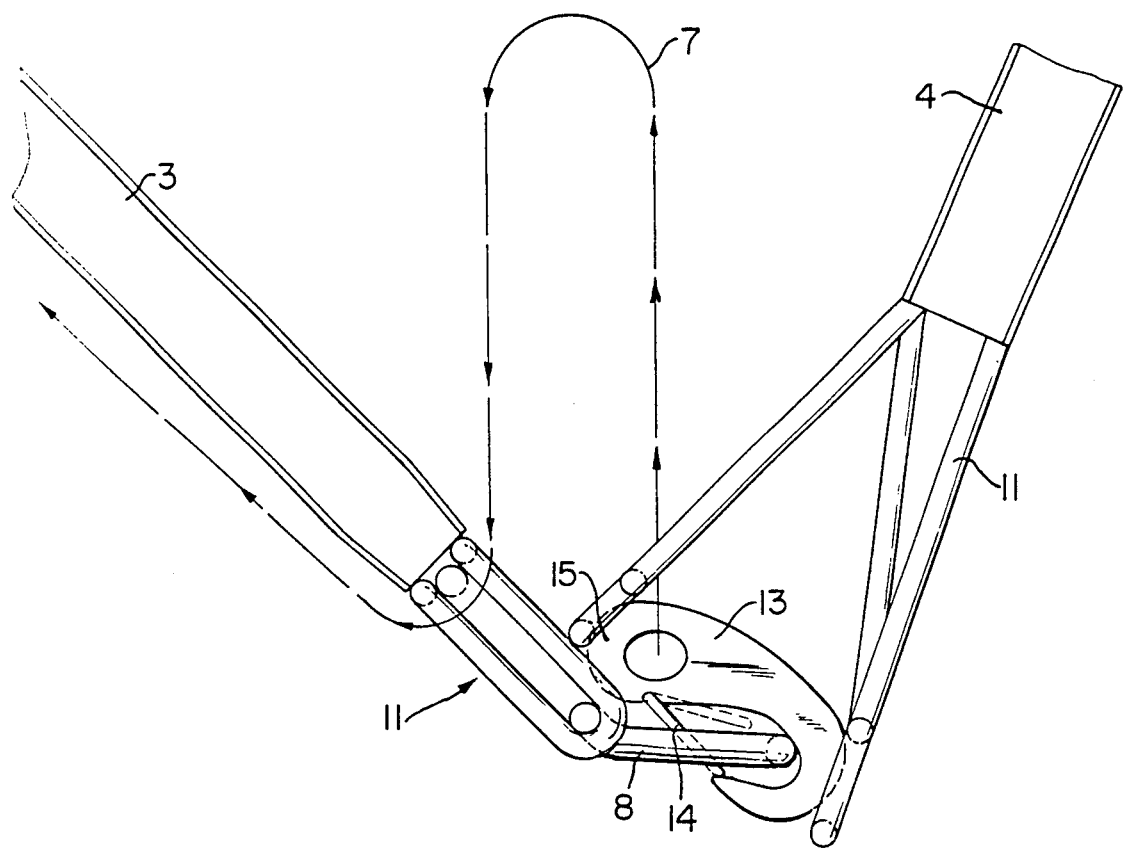
FIG. 5 illustrates engagement of the ring and hook in the closed position.

The free end of the other arcuate member 4 is also provided with a holding member 11. This holding member 11 in the arcuate member 4 releasably holds a hook 13, as shown in FIGS. 2 and 5. The hook 13 has a lever member 14 which pivots at the base 15 of the hook 13 so as to open or close the hook 13. One end of the rope 7 is fastened to the base end 15 of the hook 13. From here, the rope 7 loops through the opening formed by the jaws 6 of the hinge 5. From the hinge 5, the rope 7 passes through the ring 8 which is held by the arcuate member 3. From the ring 8, the rope leads up to the handle 1 and is in turn held by an elastic band 17 and/or the operator.

As seen in FIG. 2, when the arcuate members 3, 4 are in the open position, the rope 7 is held in a position which would embrace an object approaching the hinge 5. When the tail end of a fish impacts the hinge 5, the U-shaped spring member 2 closes the arcuate members 3, 4 which causes the hook 13 and the ring 8 to strike one another and become released from the arcuate members 3, 4, respectively, by physically pulling back on the handle 1. When the ring 8 strikes the hook 13, the lever 14 opens to allow the ring 8 to enter the hook 13 and then closes to prevent the ring 8 from being released from the hook 13. This engagement of the ring 8 and hook 13 causes a type of lasso to be formed by the rope which is tightened around the tail of a fish when the elastic band 17 on the handle 1 and the operator pull back on the handle and the rope.

Once the ring 8, hook 13 and rope 7 are disengaged from the arcuate members 3, 4 and the hinge 5, the rope remains around the tail of the fish and the remainder of the device is removed from the water.

In order to facilitate storage of the apparatus, the handle 1 can be telescoping and can be threaded, or detachably atached by other means, into the base of the U-shaped spring member 2.

If faster or more forceful spring action is required of the U-shaped spring member 2, an additional spring can be provided between the arms of the spring member. In turn, the spring 16 can also be used as the sole source of spring force in the member 2.

While the invention has been illustrated and described as embodied in a device for roping fish, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A roping device, comprising: a relatively U-shaped spring member having two arms connected by a base section; a rigid handle connected to the base section of the U-shaped spring member; a first arcuate member having a first end and a second end, said first arcuate member being pivotably connected near said second end to one arm of said spring member; a second arcuate member having a first end and a second end, said second arcuate member being pivotably connected near said second end to another arm of said spring member; hinge means for connecting together the second ends of the first and second arcuate members so that the arcuate members pivot relative to one another, said first and second arcuate members being movable between an open position in which the arms of the U-shaped member are pushed apart from a rest position, and a closed position which is entered when an impact is imparted on said hinge means so that said arms of said U-shaped spring member return to said rest position; a rope having one end releasably connected to the first end of the first arcuate member and running therefrom through the hinge means, the first end of the second arcuate member, to the handle; and means provided at the first ends of the first and second arcuate members for forming a loop in said rope which is tightenable by pulling on said rope when said arcuate members are in said closed position.

2. An apparatus as defined in claim 1, wherein said handle is detachably attached to said U-shaped spring member.

3. An apparatus as defined in claim 2, wherein said handle is threaded to said U-shaped spring member.

4. An apparatus as defined in claim 1, wherein said handle is telescoping.

5. An apparatus as defined in claim 1; and further comprising spring means extending between the arms of the U-shaped spring member.

6. An apparatus as defined in claim 1, wherein at least one of the handle, the U-shaped member and the arcuate members is made of a non-corrosive material.

7. An apparatus as defined in claim 6, wherein the non-corrosive material is aluminum.

8. An apparatus as defined in claim 1, wherein said hinge means includes hook members which interact so as to hold the rope when said arcuate members are in said open position, and release the rope when said arcuate members move to said closed position.

9. An apparatus as defined in claim 1, wherein the rope is made of a non-corrosive material.

10. An apparatus as defined in claim 9, wherein the rope is made of nylon.

11. An apparatus as defined in claim 1, wherein said rope looping means includes a hook fixed to the one end of the rope and releasably held in the first end of the first arcuate member, and a ring releasably held in the first end of the second arcuate member, said rope passing through the ring, and said ring being engageable with said hook when said arc members move into said closed position so as to form a lasso.

12. An apparatus as defined in claim 1, and further comprising an elastic cord firmly connected at one end to said rigid handle, and at another end releasably connected to said rope so as to hold said rope in tension.

* * * * *